US012767122B2

(12) United States Patent
Lapis

(10) Patent No.: US 12,767,122 B2
(45) Date of Patent: Oct. 20, 2026

(54) METHOD FOR CONTROLLING THE WHEEL SLIP OF A MOTOR VEHICLE, CONTROL UNIT AND MOTOR VEHICLE

(71) Applicants: thyssenkrupp Presta AG, Eschen (LI); thyssenkrupp AG, Essen (DE)

(72) Inventor: Leonard Lapis, Sennwald (CH)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 49 days.

(21) Appl. No.: 18/933,441

(22) Filed: Oct. 31, 2024

(65) Prior Publication Data

US 2025/0145147 A1 May 8, 2025

(30) Foreign Application Priority Data

Nov. 2, 2023 (BE) .................................. 2023/5904

(51) Int. Cl.
*B60W 30/02* (2012.01)
*B60W 10/184* (2012.01)
*B60W 10/20* (2006.01)

(52) U.S. Cl.
CPC .......... *B60W 30/02* (2013.01); *B60W 10/184* (2013.01); *B60W 10/20* (2013.01); *B60W 2520/26* (2013.01)

(58) Field of Classification Search
CPC .... B60W 30/02; B60W 10/184; B60W 10/20; B60W 10/192; B60W 10/08; B60W 2520/26; B60W 2510/205; B60W 2710/207; B60W 2720/20; B60W 2720/26; B60W 50/085; B60W 50/087; B60W 50/14; B60T 2230/02; B60T 2270/86; B60T 8/1755; B60T 8/17552; B60T 8/17616
USPC ...................... 701/41, 42, 43, 44, 48, 70, 71
See application file for complete search history.

(56) References Cited

U.S. PATENT DOCUMENTS

| | | | | |
|---|---|---|---|---|
| 11,590,961 | B2 * | 2/2023 | Arima | B60W 30/02 |
| 2020/0247394 | A1 | 8/2020 | Arima et al. | |
| 2023/0311849 | A1 | 10/2023 | Raste et al. | |
| 2023/0322207 | A1 | 10/2023 | Plaehn et al. | |

FOREIGN PATENT DOCUMENTS

| | | | |
|---|---|---|---|
| EP | 3 694 766 | A1 | 8/2020 |
| WO | 2019/057386 | A1 | 3/2019 |

* cited by examiner

*Primary Examiner* — Hai H Huynh
(74) *Attorney, Agent, or Firm* — thyssenkrupp North America, LLC

(57) ABSTRACT

A method for controlling wheel slip of a motor vehicle having at least two wheels, an electromechanical braking system, an electric drive system, and a steer-by-wire steering system comprises: converting a target trajectory of the motor vehicle into a target movement of the motor vehicle; determining wheel-specific target longitudinal and target transverse slip values for the wheels based on the target movement using a vehicle and tyre model; and adjusting actual longitudinal and actual transverse slip values of the wheels to the respective target longitudinal and target transverse slip values by the electromechanical brake system and the electric drive system as a function of a steering angle of the steer-by-wire steering system. A motor vehicle may include a control unit designed to carry out such a method.

12 Claims, 1 Drawing Sheet

METHOD FOR CONTROLLING THE WHEEL SLIP OF A MOTOR VEHICLE, CONTROL UNIT AND MOTOR VEHICLE

CROSS REFERENCE TO RELATED APPLICATION

This application is a U.S. Non-Provisional that claims priority to Belgian Patent Application No. BE 2023/5904, filed Nov. 2, 2023, the entire content of which is incorporated herein by reference.

FIELD

The present disclosure relates to a method for controlling the wheel slip of a motor vehicle, a control unit and a motor vehicle.

BACKGROUND

To move a motor vehicle, longitudinal and transverse forces are transmitted between the wheels or tyres and the roadway. The driving stability of the vehicle is ensured as long as the maximum transmissible longitudinal and transverse forces, i.e. the available force potential or the adhesion limit of the wheels, are not exceeded.

The maximum transmissible longitudinal and transverse force of a wheel depends in particular on the wheel slip, the wheel load and the coefficient of friction between the wheel and the roadway. As the wheel load and the coefficient of friction can only be controlled to a limited extent, the wheel slip is the key variable for actively ensuring the driving stability of a motor vehicle.

Wheel slip is typically controlled by wheel actuators that brake and/or accelerate the wheels in order to adjust the actual longitudinal and transverse slip values of the wheels to the target longitudinal and transverse slip values. It is known to determine the target longitudinal and transverse slip values on the basis of a target trajectory provided by a human-machine interface, for example an operating system with steering wheel, pedals and/or gear lever, or software for automated and/or autonomous driving.

Controlling wheel slip involves overcoming inertia and is subject to modelling and estimation errors. In order to ensure the driving stability of the vehicle in every situation, the control is therefore usually carried out with a safety margin to the adhesion limit, i.e. in such a way that the available force potential of the wheels is only utilized to a certain extent. However, especially in extreme situations, this can lead to deviations from the target trajectory and thus limit driving safety.

Thus a need exists for a method which enables the wheel slip of a motor vehicle to be controlled with a reduced safety distance from the adhesion limit of the wheels. The disclosure also addresses the problem of providing a corresponding control unit and a motor vehicle.

BRIEF DESCRIPTION OF THE FIGURES

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
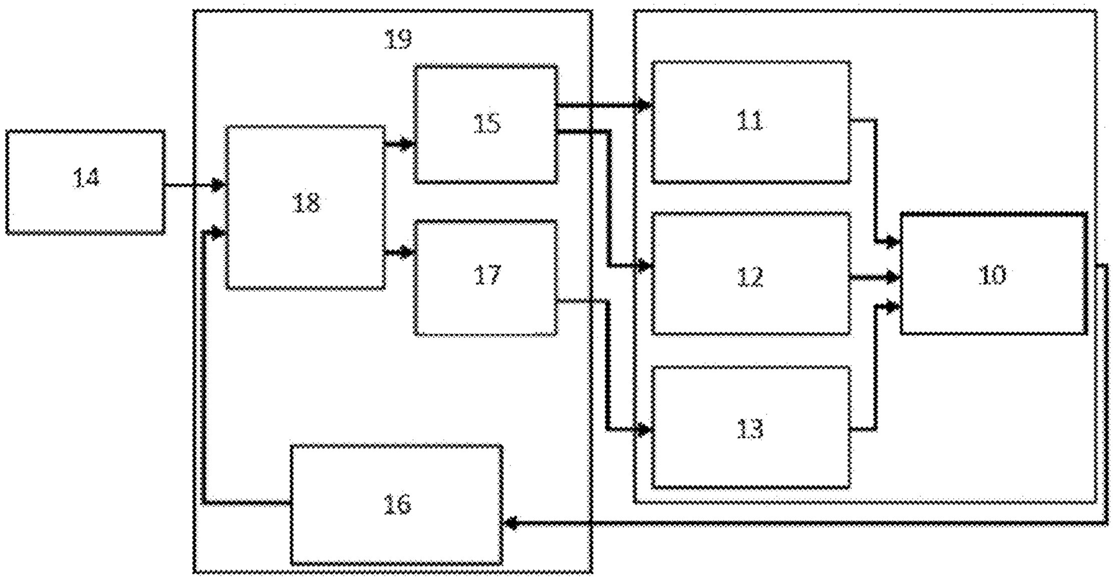
FIG. 1 a block diagram of an exemplary embodiment of a method for controlling the wheel slip of a motor vehicle according to the invention.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Specifically, the problem is solved by a method for controlling the wheel slip of a motor vehicle which has at least two wheels, an electromechanical brake system, an electric drive system and a steer-by-wire steering system. The method comprises the following steps:

- converting a target trajectory of the motor vehicle into a target movement of the motor vehicle;
- determining wheel-specific target longitudinal and target transverse slip values for the wheels based on the target movement using a vehicle and tyre model; and
- adjusting the actual longitudinal and actual transverse slip values of the wheels to the respective target longitudinal and target transverse slip values by the electromechanical brake system and the electric drive system as a function of a steering angle of the steer-by-wire steering system.

The method according to the invention is based on the concept of converting the target trajectory into a target movement of the motor vehicle in an intermediate step. As a result, the target longitudinal and target transverse slip values can be determined by means of a vehicle and tyre model in such a way that they represent the target movement particularly precisely. In this way, modelling and estimation errors are reduced when determining the target longitudinal and transverse slip values, so that only a small safety margin to the adhesion limit of the wheels needs to be maintained.

On the other hand, it is advantageous to use an electromechanical braking system and an electric drive system to adjust the actual longitudinal and actual transverse slip values to the target longitudinal and target transverse slip values. Due to their reduced inertia, these systems allow the actual longitudinal and actual transverse slip values to be adjusted to the target longitudinal and target transverse slip values particularly quickly, so that the required safety distance to the adhesion limit is advantageously further reduced.

The advantages mentioned in conjunction with the method also apply correspondingly to the control device according to the invention. The method steps described in conjunction with the method are also disclosed in conjunction with the control unit, namely in the form that the control unit is configured or adapted to carry out these method steps.

A trajectory refers in particular to the temporal development of the position of the motor vehicle, i.e. in particular the combination of the route or the path and the speed profile along the route. The longitudinal or transverse slip of a wheel is understood in particular as the ratio of the longitudinal or transverse speed at the outer circumference of the wheel to the longitudinal or transverse speed at the centre of the wheel. In particular, the wheel load is understood to be the force acting on the wheel perpendicular to the roadway.

The terms wheel and tyre are used synonymously in this document. The term control is not understood here in the strict sense of control technology, but also includes closed-loop control. The invention therefore also relates in particular to a method for controlling wheel slip as well as a corresponding control unit and motor vehicle.

In an advantageous embodiment of the invention, the target longitudinal and target transverse slip values are determined based on the actual longitudinal and actual transverse slip values. Advantageously, the actual longitudinal and actual transverse slip values are therefore included in the determination of the next target longitudinal and target transverse slip values. With such a dynamic control of the wheel slip, in particular a closed-loop control, it is advantageous to be able to react more quickly to deviations from the target movement, for example due to disturbances in reality, so that the safety distance to the adhesion limit of the wheels can advantageously be further reduced.

In a further advantageous embodiment of the invention, the vehicle and tyre model maps the ratio of longitudinal and transverse slip values of the wheels to the maximum transmissible longitudinal and transverse forces of the wheels. By taking into account the maximum transmissible longitudinal and transverse forces when determining the target longitudinal and transverse slip values, the available tyre force potential can be advantageously better utilized.

For a particularly precise determination of the target longitudinal and target transverse slip values, it is advantageous if the vehicle and tyre model maps the ratio of the longitudinal and transverse slip values to the maximum transmissible longitudinal and transverse forces as a function of the wheel loads of the wheels, in particular as a function of predicted static and/or dynamic wheel loads of the wheels.

In order to determine the target longitudinal and transverse slip values even more precisely, the ratio of the longitudinal and transverse slip values to the maximum transmissible longitudinal and transverse forces is advantageously mapped as a function of a coefficient of friction, in particular an estimated coefficient of friction, between the wheels and the roadway.

Preferably, the target trajectory is provided by a human-machine interface and/or a computer-implemented process, for example for automated or autonomous driving. This has the advantage that the invention is compatible with known interfaces in the motor vehicle and/or can be applied to standard systems.

FIG. 1 shows a block diagram of a method for controlling the wheel slip of a motor vehicle (not shown).

The motor vehicle comprises a corresponding control unit 19, which is configured to carry out the method. The motor vehicle also has wheel actuators and wheels 10, specifically four wheels 10. The wheel actuators comprise an electromechanical braking system 11, an electric drive system 12 and a steer-by-wire steering system 13.

The first step of the method is to convert a target trajectory 14 of the motor vehicle into a target movement of the motor vehicle. For this purpose, a target movement generator 18 converts the target trajectory 14 into a two- or three-dimensional target movement of the motor vehicle, specifically of the wheels 10 of the motor vehicle.

The target trajectory 14 is provided by a human-machine interface, specifically an operating system with steering wheel, pedals and/or gear lever, and/or a computer-implemented method, specifically software for automated or autonomous driving. In the exemplary embodiment shown, the human-machine interface and the computing unit on which the computer-implemented method is executed are part of the motor vehicle, i.e. are arranged inside the vehicle. Both the human-machine interface and the computing unit on which the computer-implemented method is executed can also be arranged outside the vehicle, for example in a remote control centre. The target trajectory 14 can also be provided by other systems or computer-implemented methods.

According to the next step of the method, the target movement generator 18 determines wheel-specific target longitudinal and target transverse slip values 15 for the wheels 10 based on the target movement using a vehicle and tyre model 16. The target movement generator 18 thus converts the target movement of the motor vehicle into a separate target longitudinal and target transverse slip value for each wheel, using the vehicle and tyre model 16.

The target longitudinal and target transverse slip values 15 are determined based on the actual longitudinal and actual transverse slip values. Specifically, the target movement generator 18 takes the current actual longitudinal and actual transverse slip values into account when determining the next target longitudinal and target transverse slip values 15. A closed control circuit or closed-loop control is thus formed.

The target movement generator 18 also determines a target steering angle 17 for the steer-by-wire steering system 13 based on the target movement. In addition, the target steering angle 17 can also be determined as a function of the target longitudinal and target transverse slip values 15. It is therefore possible for the target steering angle 17 to be determined in such a way that it supports the achievement of the target longitudinal and target transverse slip values 15 by the actual longitudinal and actual transverse slip values.

The final step of the method involves adjusting the actual longitudinal and actual transverse slip values of the wheels 10 to the respective target longitudinal and target transverse slip values 15 by the electromechanical brake system 11 and the electric drive system 12 as a function of a steering angle, in particular target steering angle 17 and/or actual steering angle, of the steer-by-wire steering system 13. For this purpose, the wheels 10 are driven and/or braked by the electromechanical brake system 11 and/or the electric drive system 12 as a function of the steering angle in such a way that a change in the actual longitudinal and actual transverse slip values in the direction of the target longitudinal and target transverse slip values 15 is brought about.

The steer-by-wire steering system 13 adjusts the actual steering angle to the target steering angle 17.

Figure 2:
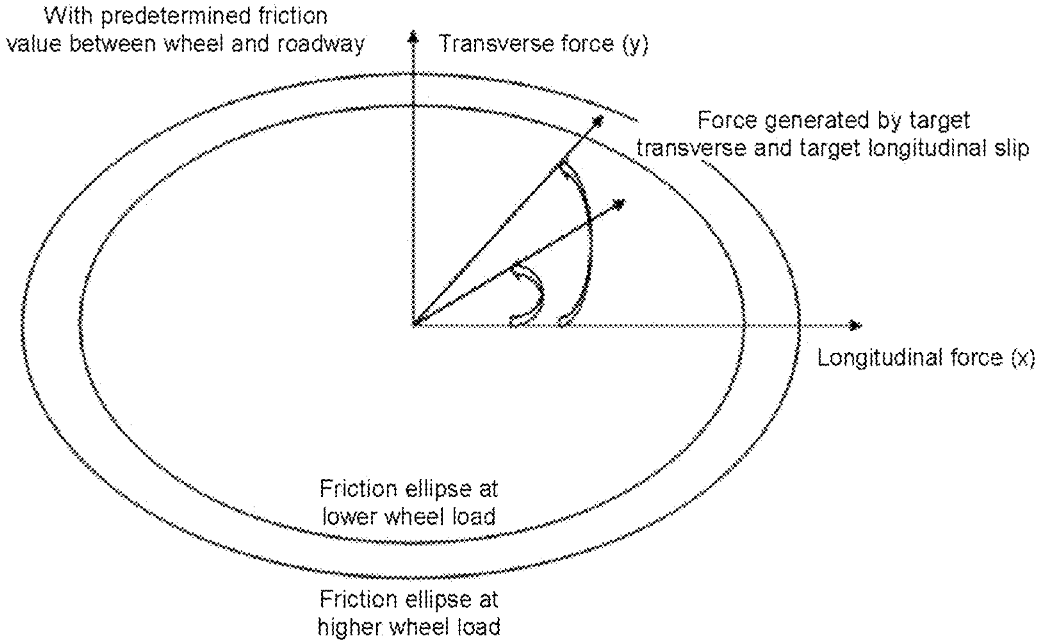
FIG. 2 a visualization of the vehicle and tyre model used in the method from FIG. 1.

FIG. 2 shows a visualization of the vehicle and tyre model 16 used in the method shown in FIG. 1.

The vehicle and tyre model 16 maps the ratio of the longitudinal and transverse slip values to the maximum transmissible longitudinal and transverse forces of the wheels 10. The vehicle and tyre model 16 can thus determine the force generated by the target longitudinal and target transverse slip values 15, i.e. the longitudinal and transverse force acting between the wheel and the roadway, and relate it to the maximum transmissible force. Similarly, the vehicle and tyre model 16 can determine the combination of target longitudinal and target transverse slip values 15 of each wheel at which the substantially maximum transmissible longitudinal and transverse force or a longitudinal and transverse force with reduced, in particular minimal, distance to the adhesion limit acts.

The ratio of the longitudinal and transverse slip values to the maximum transmissible longitudinal and transverse forces is mapped as a function of the wheel loads of the wheels 10, in particular of predicted, static and/or dynamic wheel loads of the wheels 10.

The ratio of the longitudinal and transverse slip values to the maximum transmissible longitudinal and transverse forces is also mapped as a function of a coefficient of friction between the wheels 10 and the roadway, wherein the coefficient of friction can be determined in particular on the basis of an estimation.

The vehicle model can include a friction ellipse, in particular a Krempel friction ellipse, i.e. a representation of the transmissible, in particular the maximum transmissible, longitudinal and transverse forces of a wheel with combined longitudinal and transverse slip of the wheel.

The method shown in FIG. 1 and FIG. 2 is explained below using two exemplary driving manoeuvres on a smooth roadway, wherein a collision of the motor vehicle with an obstacle towards which the motor vehicle is moving is to be prevented. The driving manoeuvres are performed by a human driver using an operating system with at least a steering wheel and a brake pedal. The driving manoeuvres can also be performed by a machine.

In a first driving manoeuvre, the driver notices the obstacle and depresses the brake pedal while holding the steering wheel straight, i.e. at a steering angle of substantially 0°. According to the method, the target longitudinal and transverse slip values 15 are then determined in such a way that the deceleration is maximized, taking into account interference forces on the wheels 10 and the forward weight transfer, i.e. the distribution of the wheel loads on the front wheels 10.

In a second driving manoeuvre, the driver notices that the obstacle must be avoided by a steering manoeuvre, as the vehicle would not come to a stop in front of the obstacle. The driver therefore moves the steering wheel so that a steering angle of greater than/less than 0° is set while pressing the brake pedal. According to the method, the target longitudinal and target transverse slip values 15 are then selected dynamically as a function of the respective relationship between the wheel and the vehicle alignment, i.e. as a function of the steering angle, in such a way that the substantially maximum available transverse force is transmitted between the wheel and the road at each steering angle. For this purpose, the vehicle and tyre model 16 follows the friction ellipse of each wheel, which represents the maximum transmissible longitudinal and transverse force or adhesion limit, as a function of the steering angle.

If the wheel load on one side of the motor vehicle is particularly low during a highly dynamic driving manoeuvre, the priority according to the method can be to prevent the motor vehicle from rolling over about its longitudinal axis. For this purpose, the target longitudinal and target transverse slip values 15 are determined in such a way that the transverse forces between the wheels 10 and the roadway tend to decrease, for example by locking the wheels 10, so that the motor vehicle tends to slip rather than roll over.

The method shown can also be used to manipulate the understeer or oversteer characteristics of the vehicle by controlling the longitudinal and transverse slip values individually for each wheel, in particular for driving modes such as sport, off-road and/or comfort.

LIST OF REFERENCE SIGNS

10 wheels
11 electromechanical braking system
12 electric drive system
13 steer-by-wire steering system
14 target trajectory
target longitudinal and transverse slip values
16 vehicle and tyre model
17 target steering angle
18 target movement generator
19 control unit

The invention claimed is:

1. A method for controlling wheel slip of a motor vehicle having a control unit, at least two wheels, an electromechanical braking system, an electric drive system, and a steer-by-wire steering system, the method comprising:

converting, by the control unit, a target trajectory of the motor vehicle into a target movement of the motor vehicle;

determining, by the control unit, wheel-specific target longitudinal and target transverse slip values for the wheels based on the target movement using a vehicle and tyre model; and adjusting, by the electromechanical braking system and the electric drive system, as a function of a steering angle of the steer-by-wire steering system, actual longitudinal and actual transverse slip values of the wheels to the respective target longitudinal and target transverse slip values.

2. The method according to claim 1, wherein the target longitudinal and target transverse slip values are determined on the basis of the actual longitudinal and actual transverse slip values.

3. The method according to claim 1, wherein the vehicle and tyre model maps the ratio of longitudinal and transverse slip values of the wheels to the maximum transmissible longitudinal and transverse forces of the wheels.

4. The method according to claim 3, wherein the ratio is mapped as a function of static and/or dynamic wheel loads of the wheels.

5. The method according to claim 3, wherein the ratio is mapped as a function of predicted static and/or dynamic wheel loads of the wheels.

6. The method according to claim 3, wherein the ratio is mapped as a function of a coefficient of friction between the wheels and the roadway.

7. The method according to claim 3, wherein the ratio is mapped as a function of an estimated coefficient of friction between the wheels and the roadway.

8. The method according to claim 1, wherein the target trajectory is provided by a computer-implemented method.

9. The method according to claim 1, wherein the motor vehicle includes a human-machine interface and the target trajectory is provided via the human-machine interface.

10. The method according to claim 1, wherein the motor vehicle includes a steering wheel, pedals, and a gear lever and the target trajectory is provided via the steering wheel, pedals, and gear lever.

11. A control device for controlling wheel slip of a motor vehicle having at least two wheels, an electromechanical braking system, an electric drive system and a steer-by-wire steering system, wherein the control device is adapted to perform a method comprising:

converting, by a target movement generator running on the control device, a target trajectory of the motor vehicle into a target movement of the motor vehicle;

determining, by the target movement generator running on the control device, wheel-specific target longitudinal and target transverse slip values for the wheels based on the target movement using a vehicle and tyre model; and adjusting, by the electromechanical braking system and the electric drive system, as a function of a steering angle of the steer-by-wire steering system, actual longitudinal and actual transverse slip values of the wheels to the respective target longitudinal and target transverse slip values.

12. A motor vehicle with a control device according to claim 11.

* * * * *